(12) United States Patent
Lichun et al.

(10) Patent No.: US 11,151,984 B2
(45) Date of Patent: Oct. 19, 2021

(54) MULTI-LANGUAGE MIXED SPEECH RECOGNITION METHOD

(71) Applicant: YUTOU TECHNOLOGY (HANGZHOU) CO., LTD., Hangzhou (CN)

(72) Inventors: Fan Lichun, Hangzhou (CN); Meng Meng, Hangzhou (CN); Peng Gao, Hangzhou (CN)

(73) Assignee: YUTOU TECHNOLOGY (HANGZHOU) CO., LTD., Hangzhou (CN)

( * ) Notice: Subject to any disclaimer, the term of this patent is extended or adjusted under 35 U.S.C. 154(b) by 0 days.

(21) Appl. No.: 16/487,279

(22) PCT Filed: Jan. 26, 2018

(86) PCT No.: PCT/CN2018/074314
§ 371 (c)(1),
(2) Date: Aug. 20, 2019

(87) PCT Pub. No.: WO2018/153213
PCT Pub. Date: Aug. 30, 2018

(65) Prior Publication Data
US 2019/0378497 A1 Dec. 12, 2019

(30) Foreign Application Priority Data
Feb. 24, 2017 (CN) .......................... 201710103972.7

(51) Int. Cl.
*G10L 15/197* (2013.01)
*G10L 15/14* (2006.01)
(Continued)

(52) U.S. Cl.
CPC .......... *G10L 15/148* (2013.01); *G10L 15/005* (2013.01); *G10L 15/063* (2013.01);
(Continued)

(58) Field of Classification Search
CPC ... G10L 15/063; G10L 15/148; G10L 15/005; G10L 15/144; G10L 15/197; G10L 25/30; G10L 25/78; G10L 2015/0638
(Continued)

(56) References Cited

U.S. PATENT DOCUMENTS

2015/0112679 A1* 4/2015 Zhang .................... G10L 15/14
704/243
2017/0256254 A1* 9/2017 Huang .................... G10L 15/02
(Continued)

FOREIGN PATENT DOCUMENTS

CN 101604522 A 12/2009
CN 101826325 A 9/2010

OTHER PUBLICATIONS

Y. Li and P. Fung, "Improved mixed language speech recognition using asymmetric acoustic model and language model with code-switch inversion constraints," 2013 IEEE International Conference on Acoustics, Speech and Signal Processing, Vancouver, BC, 2013, pp. 7368-7372, doi: 10.1109/ICASSP.2013.66390 (Year: 2013).*
(Continued)

*Primary Examiner* — Bharatkumar S Shah
(74) *Attorney, Agent, or Firm* — Getech Law LLC; Jun Ye (57) ABSTRACT

The invention discloses a multi-language mixed speech recognition method, which belongs to the technical field of speech recognition; the method comprises: step S1, configuring a multi-language mixed dictionary including a plurality of different languages; step S2, performing training according to the multi-language mixed dictionary and multi-language speech data including a plurality of different languages to form an acoustic recognition model; step S3, performing training according to multi-language text corpus including a plurality of different languages to form a language recognition model; step S4, forming the speech rec-
(Continued)

ognition system by using the multi-language mixed dictionary, the acoustic recognition model and the language recognition model; and subsequently, recognizing mixed speech by using the speech recognition system, and outputting a corresponding recognition result. The above technical solution has the beneficial effects of being able to support the recognition of mixed speech in multiple languages, improving the accuracy and efficiency of recognition, and thus improving the performance of the speech recognition system.

13 Claims, 3 Drawing Sheets

(51) Int. Cl.
    *G10L 15/00*     (2013.01)
    *G10L 15/06*     (2013.01)
    *G10L 25/30*     (2013.01)
    *G10L 25/78*     (2013.01)

(52) U.S. Cl.
    CPC .......... *G10L 15/144* (2013.01); *G10L 15/197* (2013.01); *G10L 25/30* (2013.01); *G10L 25/78* (2013.01); *G10L 2015/0638* (2013.01)

(58) Field of Classification Search
    USPC ........................................................ 704/256
    See application file for complete search history.

(56) References Cited

U.S. PATENT DOCUMENTS

2019/0266998 A1*   8/2019   Liang ..................... G06F 17/18
2019/0287514 A1*   9/2019   Ding ...................... G10L 15/14

OTHER PUBLICATIONS

N. Hirayama, K. Yoshino, K. Itoyama, S. Mori and H. G. Okuno, "Automatic Speech Recognition for Mixed Dialect Utterances by Mixing Dialect Language Models," in IEEE/ACM Transactions on Audio, Speech, and Language Processing, vol. 23, No. 2, pp. 373-382, Feb. 2015, doi: 10.1109/TASLP.2014.2387414. (Year: 2015).*
Li and P. Fung, "Improved mixed language speech recognition using asymmetric acoustic model and language model with code-switch inversion constraints," 2013 IEEE International Conference on Acoustics, Speech and Signal Processing, Vancouver, BC, 2013, pp. 7368-7372, doi: 10.1109/ICASSP.2013.66390 (Year: 2013).*
PCT/CN2018/074314—International Search Report, dated Apr. 28, 2018, 5 pages in Chinese, 3 pages English translation.
Shi Jin, et al., Multilingual-based PRLM for Language Identification, 2008, 5 pages, ISSN: 1000-0054, vol. 48, No. S1.
Sheng-Min, et al., Research of Chinese-English Bilingual Acoustic Modeling, Aug. 11, 2004, 7 pages, ISSN: 1003-0077, vol. 18, No. 5.
Hai-To, et al., Multilingual Acoustic Modeling for Automatic Speech Recognition, Dec. 2015, 4 pages, vol. 34, No. 6 Pt. 2.
PCT/CN2018/074314—Written Opinion, dated Apr. 28, 2018, 3 pages.
201710103972.7—First Office Action, 5 pages in Chinese, 6 pages English translation.

* cited by examiner

MULTI-LANGUAGE MIXED SPEECH RECOGNITION METHOD

FIELD OF THE INVENTION

The present invention relates to the field of speech recognition technology, and in particular, to a multi-language mixed speech recognition method.

BACKGROUND OF THE INVENTION

In the expression of everyday speech, people often inadvertently use an expression manner in which one language is mixed with one or another several languages, for example, some English words will directly use their original names in Chinese, such as "ipad", "iphone", "USB" and other proper nouns, resulting in mixture of Chinese and English, and this phenomenon brings certain difficulties and challenges to speech recognition.

The recognition principle of an early multi-language mixed speech recognition system is to respectively establish individual speech recognition systems, then segment the mixed speech, send speech segments of different languages into the corresponding speech recognition systems for recognition, and finally merge the recognition results of the speech segments to form the recognition result of the mixed speech. On one hand, this recognition method is difficult to ensure the accuracy of segmenting the mixed speech according to the language, and on the other hand, the context information of each segment formed after the segmentation is too short, thus affecting the recognition accuracy.

In recent years, the practice of the multi-language mixed speech recognition method begins to change, specifically, dictionary expansion is performed on the individual speech recognition systems, that is, another language is pieced together by using phone sets of one language, for example, the "iphone" in English is pieced together as "love crazy" in the pronunciation in a Chinese dictionary. Although the vocabularies of different languages can be recognized by such recognition method, on one hand, it is required that the pronunciation of a user is very strange (for example, the "iphone" must be accurately pronounced as "love crazy" in Chinese), and on the other hand, the accuracy of recognizing the entire sentence of mixed speech is greatly reduced.

SUMMARY OF THE INVENTION

According to the above problems existing in the prior art, a technical solution of a multi-language mixed speech recognition method is provided for supporting the recognition of mixed speech in multiple languages and improving the accuracy and efficiency of recognition, and thus the performance of a speech recognition system is improved.

The above technical solution specifically includes:

A multi-language mixed speech recognition method, wherein a speech recognition system for recognizing mixed speech in multiple languages is formed at first, and the method for forming the speech recognition system includes:

step S1, configuring a multi-language mixed dictionary including a plurality of different languages;

step S2, performing training according to the multi-language mixed dictionary and multi-language speech data including a plurality of different languages to form an acoustic recognition model;

step S3, performing training according to multi-language text corpus including a plurality of different languages to form a language recognition model;

step S4, forming the speech recognition system by using the multi-language mixed dictionary, the acoustic recognition model and the language recognition model; and subsequently, recognizing mixed speech by using the speech recognition system, and outputting a corresponding recognition result.

Preferably, according to the multi-language mixed speech recognition method, wherein, in the step S1, the multi-language mixed dictionary is configured according to a single-language dictionary corresponding to each different language in a manner of triphone modeling.

Preferably, according to the multi-language mixed speech recognition method, wherein, in the step S1, the multi-language mixed dictionary is configured in a manner of triphone modeling; and when the multi-language mixed dictionary is being configured, a corresponding language mark is respectively added in front of the phone of each language included in the multi-language mixed dictionary to distinguish the phones of the plurality of different languages.

Preferably, according to the multi-language mixed speech recognition method, wherein the step S2 specifically includes:

step S21, performing training according to multi-language speech data in which a plurality of different languages are mixed and the multi-language mixed dictionary to form an acoustic model;

step S22, extracting a speech feature from the multi-language speech data, and performing a frame alignment operation on the speech feature by using the acoustic model to obtain an output label corresponding to the speech feature in each frame; and step S23, using the speech feature as input data of the acoustic recognition model, and using the output label corresponding to the speech feature as an output label in an output layer of the acoustic recognition model to perform training to form the acoustic recognition model.

Preferably, according to the multi-language mixed speech recognition method, wherein the acoustic model is a hidden Markov-Gaussian mixture model.

Preferably, according to the multi-language mixed speech recognition method, wherein, in the step S23, after the acoustic recognition model is trained, the output layer of the acoustic recognition model is adjusted, which specifically includes:

step S231, respectively calculating a prior probability of each language, and calculating the common prior probability of silence of all kinds of languages;

step S232, respectively calculating a posterior probability of each language, and calculating the posterior probability of silence; and step S233, adjusting the output layer of the acoustic recognition model according to the prior probability and the posterior probability of each language, and the prior probability and the posterior probability of silence.

Preferably, according to the multi-language mixed speech recognition method, wherein, in the step S231, the prior probability of each language is respectively calculated according to the following formula:

$$P(q_j^i) = \text{Count}(q_j^i) \Big/ \left( \sum_{i=1}^{M_j} \text{Count}(q_j^i) + \sum_{i=1}^{M_{sil}} \text{Count}(q_{sil}^i) \right);$$

wherein, $q_j^i$ is used for expressing the output label of the ith state of the jth language in the multi-language speech data;

$P(q_j^i)$ is used for representing the prior probability of the output label $q_j^i$ in the multi-language speech data;

Count($q_j^i$) is used for representing the total number of the output labels $q_j^i$ in the multi-language speech data;

$q_{si\ l}^i$ is used for representing the output label of the ith state of silence in the multi-language speech data;

Count($q_{si\ l}^i$) is used for representing the total number of the output labels $q_{si\ l}^i$ in the multi-language speech data;

$M_j$ is used for representing the total number of states in the jth language in the multi-language speech data; and $M_{si\ l}$ is used for representing the total number of states of silence in the multi-language speech data.

Preferably, according to the multi-language mixed speech recognition method, wherein, in the step S231, the prior probability of silence is calculated according to the following formula:

$$P(q_{sil}^i) = \text{Count}(q_{sil}^i) / \left( \sum_{j=1}^{L} \sum_{i=1}^{M_j} \text{Count}(q_j^i) + \sum_{i}^{M_{sil}} \text{Count}(q_{sil}^i) \right);$$

wherein, $q_{si\ l}^i$ is used for expressing the output label of the ith state of silence in the multi-language speech data;

$P(q_{si\ l}^i)$ is used for representing the prior probability of the output label $q_{si\ l}^i$ in the multi-language speech data;

Count($q_{si\ l}^i$) is used for representing the total number of the output labels $q_{si\ l}^i$ in the multi-language speech data;

$q_j^i$ is used for representing the output label of the ith state of the jth language in the multi-language speech data;

Count($q_j^i$) is used for representing the total number of the output labels $q_j^i$ in the multi-language speech data;

$M_j$ is used for representing the total number of states in the jth language in the multi-language speech data;

$M_{si\ l}$ is used for representing the total number of states of silence in the multi-language speech data; and L is used for representing all languages in the multi-language speech data.

Preferably, according to the multi-language mixed speech recognition method, wherein, in the step S232, the posterior probability of each language is respectively calculated according to the following formula:

$$P(q_j^i | x) = \exp(y_j^i) / \left( \sum_{i=1}^{M_j} \exp(y_j^i) + \sum_{i=0}^{M_{sil}} \exp(y_{sil}^i) \right);$$

wherein, $q_j^i$ is used for representing the output label of the ith state of the jth language in the multi-language speech data;

x is used for representing the speech feature;

$P(q_j^i|x)$ is used for representing the posterior probability of the output label $q_j^i$ in the multi-language speech data;

$y_j^i$ is used for representing the input data of the ith state of the jth language in the multi-language speech data;

$y_{si\ l}^i$ is used for representing the input data of the ith state of silence;

$M_j$ is used for representing the total number of states in the jth language in the multi-language speech data;

$M_{si\ l}$ is used for representing the total number of states of silence in the multi-language speech data; and exp is used for representing an exponential function calculation manner.

Preferably, according to the multi-language mixed speech recognition method, wherein, in the step S232, the posterior probability of silence is calculated according to the following formula:

$$P(q_j^i | x) = \exp(y_{si}^i) / \left( \sum_{j=1}^{L} \sum_{i=1}^{M_j} \exp(y_j^i) + \sum_{i=0}^{M_{sil}} \exp(y_{sil}^i) \right);$$

wherein, $q_{si\ l}^i$ is used for representing the output label of the ith state of silence in the multi-language speech data;

x is used for representing the speech feature;

$P(q_{si\ l}^i|x)$ is used for representing the posterior probability of the output label $q_{si\ l}^i$ in the multi-language speech data;

$y_j^i$ is used for representing the input data of the ith state of the jth language in the multi-language speech data;

$y_{si\ l}^i$ is used for representing the input data of the ith state of silence;

$M_j$ is used for representing the total number of states in the jth language in the multi-language speech data;

$M_{si\ l}$ is used for representing the total number of states of silence in the multi-language speech data;

L is used for representing all languages in the multi-language speech data; and exp is used for representing an exponential function calculation manner.

Preferably, according to the multi-language mixed speech recognition method, wherein, in the step S2, the acoustic recognition model is an acoustic model of a deep neural network.

Preferably, according to the multi-language mixed speech recognition method, wherein, in the step S3, the language recognition model is formed by training by using an n-Gram model, or the language recognition model is formed by training by using a recurrent neural network.

Preferably, according to the multi-language mixed speech recognition method, wherein, after the speech recognition system is formed, weight adjustment is performed on different kinds of languages in the speech recognition system at first;

the steps of performing the weight adjustment include:

step A1, respectively determining a posterior probability weight value of each language according to real speech data; and step A2, respectively adjusting the posterior probability of each language according to the posterior probability weight value to complete the weight adjustment.

Preferably, according to the multi-language mixed speech recognition method, wherein, in the step A2, the weight adjustment is performed according to the following formula:

$$\hat{P}(q_j^i|x) = a_j \cdot P(q_j^i|x);$$

wherein, $q_j^i$ is used for representing the output label of the ith state of the jth language in the multi-language speech data;

x is used for representing the speech feature;

$P(q_j^i|x)$ is used for representing the posterior probability of the output label $q_j^i$ in the multi-language speech data;

$a_j$ is used for representing the posterior probability weight value of the jth language in the multi-language speech data; and $\hat{P}(q_j^i|x)$ is used for representing the posterior probability of the output label $q_j^i$ in the multi-language speech data after the weight adjustment.

The above technical solution has the beneficial effects of providing a multi-language mixed speech recognition method, which is capable of supporting the recognition of mixed speech in multiple languages and improving the accuracy and efficiency of recognition, and thus the performance of the speech recognition system is improved

DETAILED DESCRIPTION OF THE EMBODIMENTS

A clear and complete description of technical solutions in the embodiments of the present invention will be given below, in combination with the drawings in the embodiments of the present invention. Apparently, the embodiments described below are merely a part, but not all, of the embodiments of the present invention. All of other embodiments, obtained by those of ordinary skill in the art based on the embodiments of the present invention without any creative effort, fall into the protection scope of the present invention.

It should be noted that the embodiments in the present invention and the features in the embodiments can be combined with each other without conflict.

A further description of the present invention is given below in combination with the drawings and specific embodiments, but is not used as a limitation to the present invention.

Based on the above problems existing in the prior art, the present invention provides a multi-language mixed speech recognition method, the so-called mixed speech refers to speech data in which a plurality of different languages are mixed, for example, a user inputs "I need a USB interface" in speech, the segment of speech not only includes Chinese speech, but also includes an English proper noun "USB", and then the segment of speech is mixed speech. In other embodiments of the present invention, the mixed speech can also be a mixture of two or more kinds of speech, which is not limited herein.

Figure 1:
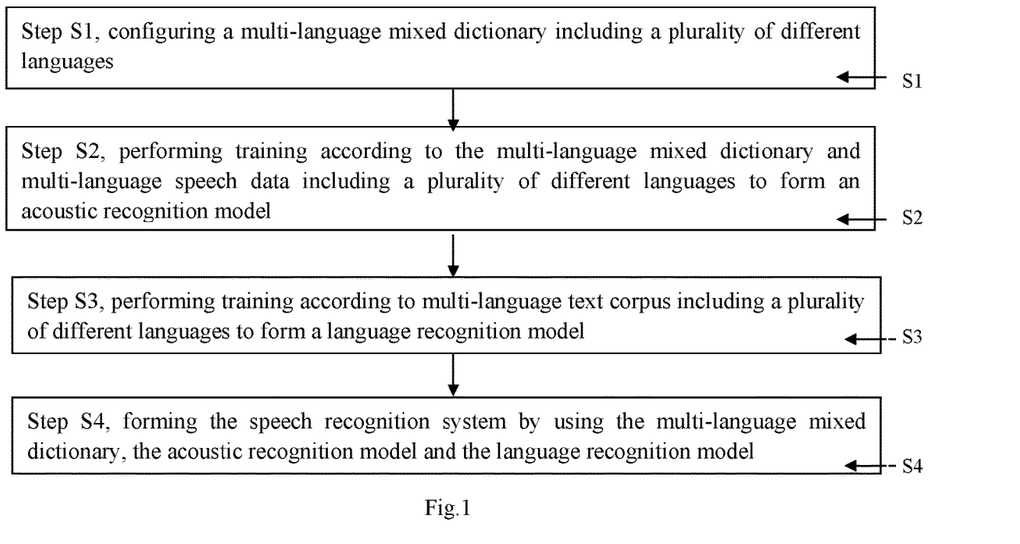
FIG. 1 is a schematic diagram of an overall flow of forming a speech recognition system in a multi-language mixed speech recognition method in a preferred embodiment of the present invention.

In the above multi-language mixed speech recognition method, a speech recognition system for recognizing mixed speech needs to be formed at first. The method for forming the speech recognition system is specifically as shown in FIG. 1, and includes:

step S1, configuring a multi-language mixed dictionary including a plurality of different languages;

step S2, performing training according to the multi-language mixed dictionary and multi-language speech data including a plurality of different languages to form an acoustic recognition model;

step S3, performing training according to multi-language text corpus including a plurality of different languages to form a language recognition model; and step S4, forming the speech recognition system by using the multi-language mixed dictionary, the acoustic recognition model and the language recognition model.

After the speech recognition system is formed, the mixed speech can be recognized by using the speech recognition system, and a corresponding recognition result is output.

Specifically, in the present embodiment, the multi-language mixed dictionary is a mixed dictionary including a plurality of different languages, and the mixed dictionary is configured to a phone level. In a preferred embodiment of the present invention, the above mixed dictionary is configured in a manner of triphone modeling, and a dictionary model more stable than word modeling can be obtained. In addition, since the dictionaries of different languages may contain phones represented by the same characters, it is necessary to respectively add a corresponding language mark in front of the phone of each language included in the multi-language mixed dictionary to distinguish the phones of the plurality of different languages, when the mixed dictionary is configured.

Figure 2:
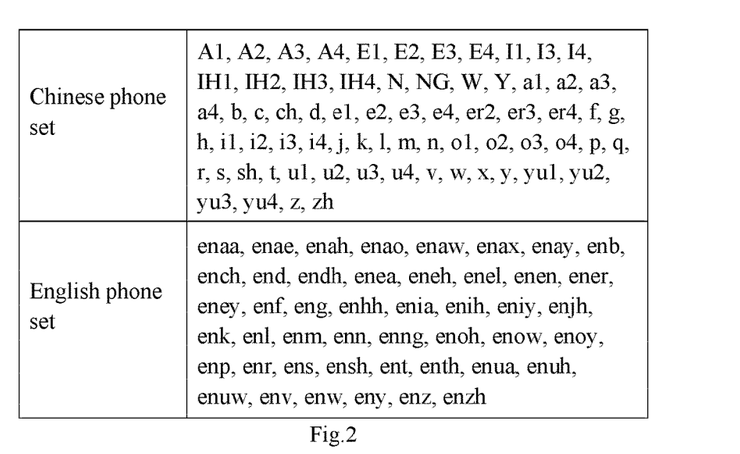
FIG. 2 is a schematic diagram of a multi-language mixed dictionary in a preferred embodiment of the present invention.

For example, both Chinese and English phone sets include "b", "d" and other phones. To distinguish them, language marks are added in front of all English phone subsets (for example, "en" is added to serve as a prefix), so as to distinguish the English phone set from the Chinese phone set, as shown in FIG. 2.

The above language mark can be empty, for example, if there are two languages in the mixed dictionary, the language mark only needs to be added to one language to distinguish the two languages. Similarly, if there are three languages in the mixed dictionary, the language marks only need to be added to two languages to distinguish the three languages, and so on.

In the above mixed dictionary, the language mark can also be added between the phone sets that may cause confusion, for example, one mixed dictionary includes Chinese, English and other languages, and only the Chinese and English phone sets may be confused, therefore the language mark only needs to be added in front of the English phone set.

In the present embodiment, after the multi-language mixed dictionary is formed, training is performed according to the multi-language mixed dictionary and multi-language speech data including a plurality of different languages to form an acoustic recognition model. Specifically, the multi-language speech data are mixed speech data prepared in advance and including a plurality of different languages for training, and the mixed dictionary provides phones of different languages in the process of forming the acoustic recognition model. Therefore, in the process of performing training to form the acoustic recognition model in which a plurality of different languages are mixed, in order to obtain a triphone relationship of the mixed language phones, the above multi-language speech data in which a plurality of different languages are mixed need to be prepared, and the operation is performed according to the multi-language mixed dictionary formed above.

In the present embodiment, training is performed according to multi-language text corpus in which a plurality of different languages are mixed to form a language recognition model, the multi-language mixed dictionary, the acoustic recognition model and the language recognition model are included in a speech recognition system, and the mixed speech input by a user and including a plurality of languages is recognized according to the speech recognition system to output a recognition result.

In the present embodiment, after the above processing, the recognition process of the above mixed speech is similar to the recognition process of the single-language speech in the prior art, speech features in a segment of speech data are recognized as corresponding phones or word sequences via the acoustic recognition model, and the word sequences are recognized as a complete sentence through the language recognition model, thereby completing the recognition process of the mixed speech. The above recognition process will not be described in detail herein.

In summary, in the technical solution of the present invention, the multi-language mixed dictionary including a plurality of languages is formed according to a plurality of language dictionaries of single languages at first, and language marks are added to the phones of the different languages for distinguishing. Then, training is performed according to the multi-language mixed speech data and the multi-language mixed dictionary to form an acoustic recognition model, and training is performed according to the multi-language mixed text corpus to form a language recognition model. Then, a complete speech recognition system is formed according to the multi-language mixed dictionary, the acoustic recognition model and the language recognition model to recognize the multi-language mixed speech input by the user.

Figure 3:
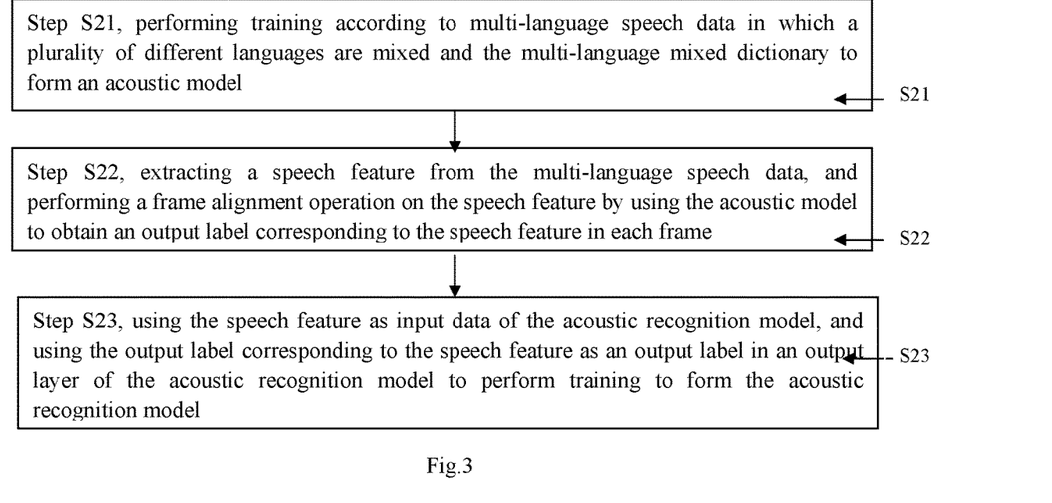
FIG. 3 is a schematic flow diagram of performing training to form an acoustic recognition model on the basis of FIG. 1 in a preferred embodiment of the present invention.

In a preferred embodiment of the present invention, as shown in FIG. 3, the step S2 specifically includes:

step S21, performing training according to multi-language speech data in which a plurality of different languages are mixed and the multi-language mixed dictionary to form an acoustic model;

step S22, extracting a speech feature from the multi-language speech data, and performing a frame alignment operation on the speech feature by using the acoustic model to obtain an output label corresponding to the speech feature in each frame; and step S23, using the speech feature as input data of the acoustic recognition model, and using the output label corresponding to the speech feature as an output label in an output layer of the acoustic recognition model to perform training to form the acoustic recognition model.

Specifically, in the present embodiment, before the acoustic recognition model is formed by training, training is performed according to multi-language speech data in which the plurality of different languages are mixed to form an acoustic model. The acoustic model can be a hidden markov model-Gussian mixture model (Hidden Markov Model-Gussian Mixture Model, HMM-GMM) model. In view of a parameter revaluation robustness problem in triphone modeling, the parameter sharing technology can be selected in the process of performing training to form the acoustic model, thereby reducing the parameter scale. The modeling technology of the acoustic model based on the HMM-GMM is quite mature at present, and thus will not be described repeatedly herein again.

In the present embodiment, after the acoustic model is formed, the frame alignment operation needs to be performed on the multi-language speech data by using the acoustic model, so that the speech feature extracted from the multi-language speech data in each frame corresponds to an output label. Specifically, after the frame alignment, the speech feature in each frame corresponds to a GMM serial number. The output label in the output layer of the acoustic recognition model is the label corresponding to the speech feature in each frame, therefore, the number of the output labels in the output layer of the acoustic recognition model is the number of GMMSs in the HMM-GMM model, and each output node corresponds to one GMM.

In the present embodiment, the speech feature is used as input data of the acoustic recognition model, and the output label corresponding to the speech feature is used as the output label in the output layer of the acoustic recognition model to perform training to form the acoustic recognition model.

Figure 4:
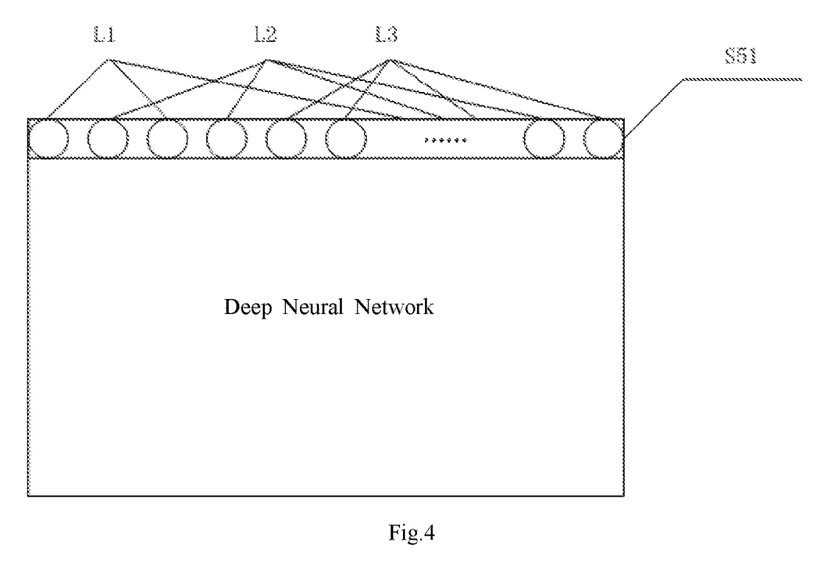
FIG. 4 is a structural schematic diagram of the acoustic recognition model in a preferred embodiment of the present invention.

FIG. 4 shows an approximate structure of the acoustic recognition model in one embodiment of the present invention, the acoustic recognition model is a deep neural network model established by a fully connected neural network structure. The neural network includes 7 fully connected neural network units in total; each layer has 2048 nodes, and a sigmoid nonlinear unit is included between each two neural networks. The output layer is implemented by using a softmax nonlinear unit. S51 in FIG. 4 is used for representing the output layer of the acoustic recognition model, and L1, L2, and L3 respectively represent the output labels on the output layer associated with different kinds of languages.

Figure 5:
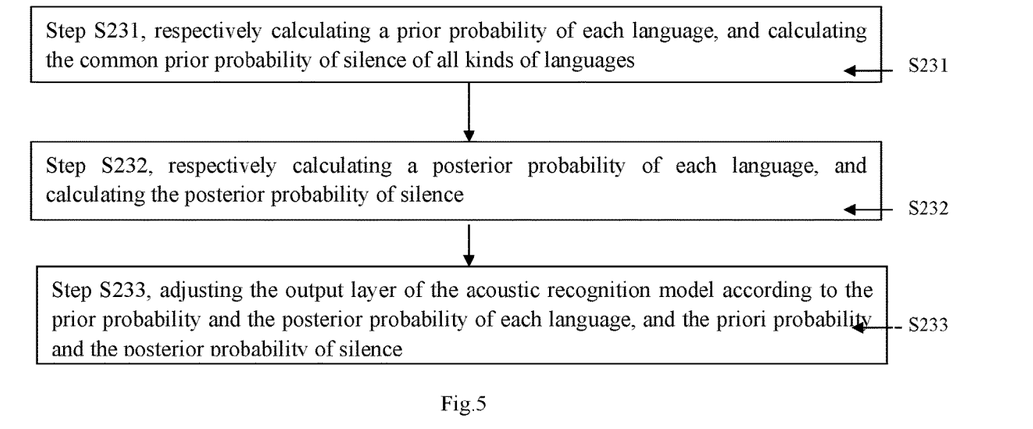
FIG. 5 is a schematic flow diagram of adjusting an output layer of the acoustic recognition model on the basis of FIG. 2 in a preferred embodiment of the present invention.

In the preferred embodiment of the present invention, in the above step S23, after the acoustic recognition model is trained, adjustment, prior and other operation need to be performed on the output layer of the acoustic recognition model in view of a plurality of languages, which is specifically as shown in FIG. 5, includes:

step S231, respectively calculating a prior probability of each language, and calculating the common prior probability of silence of all kinds of languages;

step S232, respectively calculating a posterior probability of each language, and calculating the posterior probability of silence; and step S233, adjusting the output layer of the acoustic recognition model according to the prior probability and the posterior probability of each language, and the prior probability and the posterior probability of silence.

Specifically, in a preferred embodiment of the present invention, when the acoustic recognition model is used for performing speech recognition, with respect to a given speech feature, the character string of the output result thereof is usually determined by the following formula:

$$\hat{w}=\arg \max P(w|x)P(w)/p(x); \qquad (1)$$

wherein, $\hat{w}$ is used for representing the character string of the output result, w represents a possible character string, x represents an input speech feature, P(w) is used for representing the probability of the above language recognition model, and P(x|w) is used for representing the probability of the above acoustic recognition model.

Then the above P(x|w) can be further expanded as:

$$P(x\mid w) = \sum_{q} P(x, q \mid w) \cong \max \pi(q_0) \prod_{t=1}^{T} a_{q_{t-1}q_t} \prod_{t=0}^{T} P(x_t \mid q_t); \qquad (2)$$

wherein, $x_t$ is used for representing the speech feature input at the moment t, $q_t$ is used for representing a triphone state bound at the moment t, $\pi(q_0)$ is used for representing the probability distribution of an initial state $q_0$, $P(x_t|q_t)$ is used for representing the probability that the speech feature $x_t$ is at the state $q_t$.

Then, the above $P(x_t|q_t)$ can be further expanded as:

$$P(x_t|q_t) = P(q_t|x_t)P(x_t)/P(q_t); \qquad (3)$$

wherein, $P(x_t|q_t)$ represents the posterior probability of the output layer of the acoustic recognition model, $P(q_t)$ represents the prior probability of the acoustic recognition model, and $P(x_t)$ represents the probability of $x_t$. $P(x_t)$ is not related with a character string sequence, and thus can be ignored.

According to the above formula (3), it can be concluded that the character string of the output result can be adjusted by calculating the prior probability and the posterior probability of the output layer of the acoustic recognition model.

In a preferred embodiment of the present invention, the prior probability P(q) of the neural network is usually calculated by the following formula:

$$P(q^i) = \text{Count}(q^i) + \sum_{i=1}^{N} \text{Count}(q^i); \qquad (4)$$

wherein, $\text{Count}(q^i)$ is used for representing the total number of labels $q^i$ in the multi-language speech data, and N is used for representing the total number of all output labels.

In a preferred embodiment of the present invention, since the number of training speech data of different kinds of languages may be different, the prior probability cannot be uniformly calculated and needs to be respectively calculated according to different kinds of languages.

In a preferred embodiment of the present invention, in the above step S231, the prior probability of each language is respectively calculated at first, and the common prior probability of silence of all kinds of languages is calculated.

The prior probability of each language is respectively calculated according to the following formula at first:

$$P(q_j^i) = \text{Count}(q_j^i) \bigg/ \left( \sum_{i=1}^{M_j} \text{Count}(q_j^i) + \sum_{i=1}^{M_{sil}} \text{Count}(q_{sil}^i) \right); \qquad (5)$$

wherein,
$q_j^i$ is used for expressing the output label of the ith state of the jth language in the multi-language speech data;
$P(q_j^i)$ is used for representing the prior probability of the output label $q_j^i$ in the multi-language speech data;
$\text{Count}(q_j^i)$ is used for representing the total number of the output labels $q_j^i$ in the multi-language speech data;
$q_{si\ l}^{\ i}$ is used for representing the output label of the ith state of silence in the multi-language speech data;
$\text{Count}(q_{si\ l}^{\ i})$ is used for representing the total number of the output labels $q_j^i$ in the multi-language speech data;
$M_j$ is used for representing the total number of states in the jth language in the multi-language speech data; and
$M_{si\ l}$ is used for representing the total number of states of silence in the multi-language speech data.

Then, the prior probability of silence is calculated according to the following formula:

$$P(q_{sil}^i) = \text{Count}(q_{sil}^i) \bigg/ \left( \sum_{j=1}^{L} \sum_{i=1}^{M_j} \text{Count}(q_j^i) + \sum_{i}^{M_{sil}} \text{Count}(q_{sil}^i) \right); \qquad (6)$$

wherein,
$P(q_{si\ l}^{\ i})$ is used for representing the prior probability of the output label $q_{si\ l}^{\ i}$ in the multi-language speech data; and
L is used for representing all languages in the multi-language speech data.

In a preferred embodiment of the present invention, after the prior probability of each language and the prior probability of silence are calculated, the posterior probability of the acoustic recognition model is continuously calculated. The posterior probability P(qi|x) output by the neural network is usually calculated by the output layer, and when the output layer is implemented by the softmax nonlinear unit, the posterior probability is usually calculated according to the following formula:

$$P(q^i|x) = \text{soft max}(y^i) = \exp(y^i) \bigg/ \sum_{i=1}^{N} \exp(y^i); \qquad (7)$$

wherein, $y^i$ is used for representing an input value in the ith state, and N represents the number of all states.

Similarly, in the acoustic recognition model, the imbalance of the number of training data in different kinds of languages may result in the imbalance in the distribution of state value calculation results of different kinds of languages, so the posterior probability still needs to be calculated respectively for different kinds of languages.

In a preferred embodiment of the present invention, in the above step S232, the posterior probability of each language is respectively calculated according to the following formula.

$$P(q_j^i|x) = \exp(y_j^i) \bigg/ \left( \sum_{i=1}^{M_j} \exp(y_j^i) + \sum_{i=0}^{M_{sil}} \exp(y_{sil}^i) \right); \qquad (8)$$

wherein,
x is used for representing the speech feature;
$P(q_j^i|x)$ is used for representing the posterior probability of the output label $q_j^i$ in the multi-language speech data;
$y_j^i$ is used for representing the input data of the ith state of the jth language in the multi-language speech data;
$y_{si\ l}^{\ i}$ is used for representing the input data of the ith state of silence; and
exp is used for representing an exponential function calculation manner.

In a preferred embodiment of the present invention, in the step S232, the posterior probability of silence is calculated according to the following formula:

$$P(q_{sil}^i|x) = \exp(y_{sil}^i) \bigg/ \left( \sum_{j=1}^{L} \sum_{i=1}^{M_j} \exp(y_j^i) + \sum_{i=0}^{M_{sil}} \exp(y_{sil}^i) \right); \qquad (9)$$

wherein, $P(q_{si\ l}^{\ i}|x)$ is used for representing the posterior probability of the output label $q_{si\ l}^{\ i}$ in the multi-language speech data.

In the present invention, the prior probabilities and the posterior probabilities in each language and in silence state can be calculated by using the above improved formulas (6)-(9), so that the acoustic recognition model can meet the output requirements of multi-language mixed modeling, and each language and in silence state can be described more accurately. It should be noted that after the above formulas are adjusted, the sums of the prior probabilities and the posterior probabilities are no longer 1.

In a preferred embodiment of the present invention, in the above step S3, the language recognition model can be formed by training by using an n-Gram model, or the language recognition model is formed by training by using a recurrent neural network. The above multi-language text corpus should include individual text corpus of a plurality of languages, as well as text data in which a plurality of languages are mixed.

In a preferred embodiment of the present invention, after the speech recognition system is formed, weight adjustment is performed on different kinds of languages in the speech recognition system at first.

Figure 6:
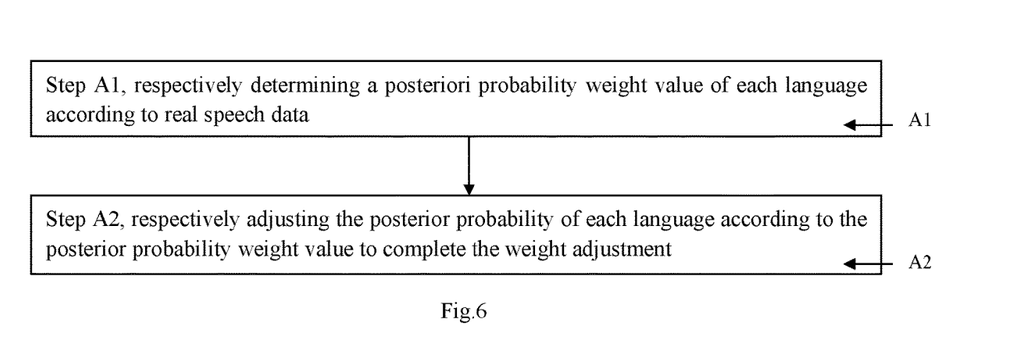
FIG. 6 is a schematic flow diagram of performing weight adjustment on the speech recognition system in a preferred embodiment of the present invention.

The steps of performing the weight adjustment, as shown in FIG. 6, include:

step A1, respectively determining a posterior probability weight value of each language according to real speech data; and step A2, respectively adjusting the posterior probability of each language according to the posterior probability weight value to complete the weight adjustment.

Specifically, in the present embodiment, after the speech recognition system is formed, a problem of unbalanced training data size may be generated in the training process, one language with relatively large data size may obtain a relatively large prior probability, since the final recognition probability is obtained by dividing the posterior probability by the prior probability, the actual recognition probability of the language with more training data is smaller, such that the recognition result of the recognition system may tend to recognize a certain language and cannot recognize another language, leading to a deviation of the recognition result.

In order to solve this problem, before the above speech recognition system is put into practical use, it is necessary to use real data as a development set to perform actual measurement so as to adjust the weight of each language. The above weight adjustment is usually applied to the posterior probability output by the acoustic recognition model, so the formula is as follows:

$$\hat{P}(q_j^i|x) = a_j \cdot P(q_j^i|x); \quad (10)$$

wherein, $q_j^i$ is used for representing the output label of the ith state of the jth language in the multi-language speech data;

x is used for representing the speech feature;

$P(q_j^i|x)$ is used for representing the posterior probability of the output label $q_j^i$ in the multi-language speech data;

$a_j$ is used for representing the posterior probability weight value of the jth language in the multi-language speech data, and the posterior probability weight value is determined by performing actual measurement on the acoustic recognition model through the development set formed by the real data.

$\hat{P}(q_j^i|x)$ is used for representing the posterior probability of the output label $q_j^i$ in the multi-language speech data after the weight adjustment.

Through the above weight adjustment, the speech recognition system can obtain a very good recognition effect in different application scenarios.

In a preferred embodiment of the present invention, for the speech recognition system mixed by Chinese and English, after the actual measurement of the real data, the posterior probability weight value of Chinese can be set as 1.0, the posterior probability weight value of English is set as 0.3, and the posterior probability weight value of silence is set as 1.0.

In other embodiments of the present invention, the posterior probability weight value can be repeatedly adjusted for multiple times by using different real data, and an optimal value is determined as last.

The above descriptions are only preferred embodiments of the present invention, and are not intended to limit the embodiments and the protection scope of the present invention. Those skilled in the art should be aware that solutions obtained by making equivalent substitutions and obvious variations by using the specification of the present invention and the contents shown in the figures shall all fall within the protection scope of the present invention.

The invention claimed is:

1. A multi-language mixed speech recognition method, comprising:
    configuring a multi-language mixed dictionary including a plurality of different languages;
    executing training, based on the multi-language mixed dictionary and multi-language speech data including the plurality of different languages, to form an acoustic recognition model;
    executing training, based on multi-language text corpus including the plurality of different languages, to form a language recognition model;
    forming a speech recognition system based on:
        the multi-language mixed dictionary,
        the acoustic recognition model, and
        the language recognition model;
    recognizing a mixed speech by the speech recognition system; and
    outputting a corresponding recognition result of the recognition of the mixed speech, wherein forming the acoustic recognition model includes:
        executing training, based on multi-language speech data in which the plurality of different languages are mixed and the multi-language mixed dictionary to form an acoustic model;
        extracting a speech feature from the multi-language speech data, and executing a frame alignment operation on the speech feature by the acoustic model to obtain an output label corresponding to the speech feature in each frame; and
        executing training, to form the acoustic recognition model, based on
            the speech feature as input data of the acoustic recognition model and
            the output label corresponding to the speech feature as an output label in an output layer of the acoustic recognition model.

2. The multi-language mixed speech recognition method according to claim 1, wherein the multi-language mixed dictionary is configured based on a single-language dictionary corresponding to each different language in a manner of triphone modeling.

3. The multi-language mixed speech recognition method according to claim 1, wherein
    the multi-language mixed dictionary is configured in a manner of triphone modeling, and
    when the multi-language mixed dictionary is being configured, a corresponding language mark is respectively added in front of a phone of each language contained in the multi-language mixed dictionary to distinguish phones of the plurality of different languages.

4. The multi-language mixed speech recognition method according to claim 1, wherein the acoustic model is a hidden Markov-Gaussian mixture model.

5. The multi-language mixed speech recognition method according to claim 1, wherein after the acoustic recognition model is trained, the output layer of the acoustic recognition model is adjusted by:

respectively calculating a prior probability of each language, and calculating the common prior probability of silence of all kinds of languages;

respectively calculating a posterior probability of each language, and calculating the posterior probability of silence; and adjusting the output layer of the acoustic recognition model based on the prior probability and the posterior probability of each language, and the prior probability and the posterior probability of silence.

6. The multi-language mixed speech recognition method according to claim 5, wherein the prior probability of each language is respectively calculated based on the following formula:

$$P(q_j^i) = \text{Count}(q_j^i) / \left( \sum_{i=1}^{M_j} \text{Count}(q_j^i) + \sum_{i=1}^{M_{sil}} \text{Count}(q_{sil}^i) \right);$$

wherein, $q_j^i$ is used for expressing the output label of the ith state of the jth language in the multi-language speech data;

$P(q_j^i)$ is used for representing the prior probability of the output label $q_j^i$ in the multi-language speech data;

$\text{Count}(q_j^i)$ is used for representing the total number of the output labels $q_j^i$ in the multi-language speech data;

$q_{si\ l}^i$ is used for representing the output label of the ith state of silence in the multi-language speech data;

$\text{Count}(q_{si\ l}^i)$ is used for representing the total number of the output labels $q_{si\ l}^i$ in the multi-language speech data;

$M_j$ is used for representing the total number of states in the jth language in the multi-language speech data; and $M_{si\ l}$ is used for representing the total number of states of silence in the multi-language speech data.

7. The multi-language mixed speech recognition method according to claim 5, wherein the prior probability of silence is calculated based on the following formula:

$$P(q_{sil}^i) = \text{Count}(q_{sil}^i) / \left( \sum_{j=1}^{L} \sum_{i=1}^{M_j} \text{Count}(q_j^i) + \sum_{i}^{M_{sil}} \text{Count}(q_{sil}^i) \right);$$

wherein, $q_{si\ l}^i$ is used for expressing the output label of the ith state of silence in the multi-language speech data;

$P(q_{si\ l}^i)$ is used for representing the prior probability of the output label $q_{si\ l}^i$ in the multi-language speech data;

$\text{Count}(q_{si\ l}^i)$ is used for representing the total number of the output labels $q_{si\ l}^i$ in the multi-language speech data;

$q_j^i$ is used for representing the output label of the ith state of the jth language in the multi-language speech data;

$\text{Count}(q_j^i)$ is used for representing the total number of the output labels $q_j^i$ in the multi-language speech data;

$M_j$ is used for representing the total number of states in the jth language in the multi-language speech data;

$M_{si\ l}$ is used for representing the total number of states of silence in the multi-language speech data; and L is used for representing all languages in the multi-language speech data.

8. The multi-language mixed speech recognition method according to claim 5, wherein the posterior probability of each language is respectively calculated based on the following formula:

$$P(q_j^i | x) = \exp(y_j^i) / \left( \sum_{i=1}^{M_j} \exp(y_j^i) + \sum_{i=0}^{M_{sil}} \exp(y_{sil}^i) \right);$$

wherein, $q_j^i$ for representing the output label of the ith state of the jth language in the multi-language speech data;

x is used for representing the speech feature;

$P(q_j^i|x)$ is used for representing the posterior probability of the output label $q_j^i$ in the multi-language speech data;

$y_j^i$ is used for representing the input data of the ith state of the jth language in the multi-language speech data;

$y_{si\ l}^i$ is used for representing the input data of the ith state of silence;

$M_j$ is used for representing the total number of states in the jth language in the multi-language speech data;

$M_{si\ l}$ is used for representing the total number of states of silence in the multi-language speech data; and exp is used for representing an exponential function calculation manner.

9. The multi-language mixed speech recognition method according to claim 5, wherein the posterior probability of silence is calculated based on the following formula:

$$P(q_{sil}^i | x) = \exp(y_{sil}^i) / \left( \sum_{j=1}^{L} \sum_{i=1}^{M_j} \exp(y_j^i) + \sum_{i=0}^{M_{sil}} \exp(y_{sil}^i) \right);$$

wherein, $q_{si\ l}^i$ is used for representing the output label of the ith state of silence in the multi-language speech data;

x is used for representing the speech feature;

$P(q_{si\ l}^i|x)$ is used for representing the posterior probability of the output label $q_{si\ l}^i$ in the multi-language speech data;

$y_j^i$ is used for representing the input data of the ith state of the jth language in the multi-language speech data;

$y_{si\ l}^i$ is used for representing the input data of the ith state of silence;

$M_j$ is used for representing the total number of states in the jth language in the multi-language speech data;

$M_{si\ l}$ is used for representing the total number of states of silence in the multi-language speech data;

L is used for representing all languages in the multi-language speech data; and exp is used for representing an exponential function calculation manner.

10. The multi-language mixed speech recognition method according to claim 1, wherein the acoustic recognition model is an acoustic model of a deep neural network.

11. The multi-language mixed speech recognition method according to claim 1, wherein the language recognition model is formed by training based on an n-Gram model, or a recurrent neural network.

12. The multi-language mixed speech recognition method according to claim 1, wherein, after the speech recognition system is formed, weight adjustment executed on different kinds of languages in the speech recognition system at first; steps of executing the weight adjustment comprise:

respectively determining a posteriori probability weight value of each language according to real speech data; and respectively adjusting the posterior probability of each language based on the posterior probability weight value to complete the weight adjustment.

13. The multi-language mixed speech recognition method according to claim 12, wherein the weight adjustment is performed based on the following formula:

$$\hat{P}(q_j^i|x) = a_j \cdot P(q_j^i|x);$$

wherein, $q_j^i$ is used for representing the output label of the ith state of the jth language in the multi-language speech data;

x is used for representing the speech feature;

$P(q_j^i|x)$ is used for representing the posterior probability of the output label $q_j^i$ in the multi-language speech data;

$a_j$ is used for representing the posteriori probability weight value of the jth language in the multi-language speech data; and $\hat{P}(q_j^i|x)$ is used for representing the posterior probability of the output label $q_j^i$ in the multi-language speech data after the weight adjustment.

* * * * *